United States Patent
Cho et al.

(10) Patent No.: US 9,762,315 B2
(45) Date of Patent: Sep. 12, 2017

(54) METHOD AND APPARATUS FOR ACQUIRING INFORMATION USING DEVICE IN IDLE STATE IN WIRELESS COMMUNICATION SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 97 days.

(21) Appl. No.: 14/441,102

(22) PCT Filed: Nov. 20, 2013

(86) PCT No.: PCT/KR2013/010549
§ 371 (c)(1),
(2) Date: May 6, 2015

(87) PCT Pub. No.: WO2014/084544
PCT Pub. Date: Jun. 5, 2014

(65) Prior Publication Data
US 2015/0304023 A1    Oct. 22, 2015

Related U.S. Application Data

(60) Provisional application No. 61/730,971, filed on Nov. 29, 2012.

(51) Int. Cl.
*H04W 4/00*    (2009.01)
*H04B 7/26*    (2006.01)
(Continued)

(52) U.S. Cl.
CPC .............. *H04B 7/26* (2013.01); *H04W 24/02* (2013.01); *H04W 88/06* (2013.01)

(58) Field of Classification Search
USPC .......................................................... 370/329
See application file for complete search history.

(56) References Cited

U.S. PATENT DOCUMENTS

2008/0311909 A1    12/2008  Taaghol et al.
2011/0081887 A1*   4/2011  Chakraborty ......... H04W 48/02
                                                        455/410

(Continued)

FOREIGN PATENT DOCUMENTS

KR    10-2011-0085940    7/2011
KR    10-2012-0014055    2/2012

(Continued)

OTHER PUBLICATIONS

PCT International Application No. PCT/KR2013/010549, Written Opinion of the International Searching Authority dated Feb. 14, 2014, 1 page.

*Primary Examiner* — Gregory Sefcheck
*Assistant Examiner* — Majid Esmaeilian
(74) *Attorney, Agent, or Firm* — Lee, Hong, Degerman, Kang & Waimey

(57) ABSTRACT

A method and apparatus of acquiring information on a primary radio access technology (RAT) system in a wireless communication system is provided. An entity of a secondary RAT system transmits a request for information on the primary RAT system to a multi-RAT device, and upon transmitting the request, starting a waiting timer which has a default value. If it is determined that the information on the primary RAT system cannot be acquired, by the multi-RAT device, until the waiting timer expires, the entity of the (Continued)

secondary RAT system reconfigures the waiting timer by a fixed value or a dynamic value.

10 Claims, 11 Drawing Sheets

(51) Int. Cl.
  *H04W 88/06* (2009.01)
  *H04W 24/02* (2009.01)

(56) References Cited

U.S. PATENT DOCUMENTS

| | | | |
|---|---|---|---|
| 2011/0195714 A1 | 8/2011 | Sawinathan | |
| 2011/0274040 A1* | 11/2011 | Pani | H04W 4/005 370/328 |
| 2012/0040687 A1* | 2/2012 | Siomina | G01S 5/0205 455/456.1 |
| 2012/0140743 A1* | 6/2012 | Pelletier | H04W 72/0453 370/335 |
| 2012/0155257 A1* | 6/2012 | Tiwari | H04W 60/005 370/230 |
| 2012/0218889 A1* | 8/2012 | Watfa | H04W 60/04 370/230 |
| 2013/0023267 A1* | 1/2013 | Ong | H04W 48/10 455/435.1 |
| 2013/0208662 A1* | 8/2013 | Lee | H04W 24/10 370/328 |
| 2014/0313889 A1* | 10/2014 | Jeong | H04W 76/028 370/230 |

FOREIGN PATENT DOCUMENTS

| | | |
|---|---|---|
| WO | 2010/087469 | 8/2010 |
| WO | 2010/138634 | 12/2010 |

* cited by examiner

FIG. 4

| Frame control | Persistent /ID | Address 1 | Address 2 | Address 3 | Sequence control | Address 4 | Sequence control | QoS control | HT control | Frame body | FCS |

METHOD AND APPARATUS FOR ACQUIRING INFORMATION USING DEVICE IN IDLE STATE IN WIRELESS COMMUNICATION SYSTEM

CROSS-REFERENCE TO RELATED APPLICATIONS

This application is the National Stage filing under 35 U.S.C. 371 of International Application No. PCT/KR2013/010549, filed on Nov. 20, 2013, which claims the benefit of U.S. Provisional Application No. 61/730,971, filed on Nov. 29, 2012, the contents of which are all hereby incorporated by reference herein in their entirety.

BACKGROUND OF THE INVENTION

Field of the Invention

The present invention relates to wireless communications, and more specifically, to a method and apparatus for acquiring information using a device in an idle state in a wireless communication system.

Related Art

With the recent trend of increasing high-rate data traffic, fifth generation mobile communication technologies are in discussion for their realistic and efficient backup. One of requirements for fifth generation mobile communication technologies is the interworking between heterogeneous wireless communication systems, particularly between a cellular system and a wireless LAN (WLAN) system. The cellular system may be one of a $3^{rd}$ generation partnership project (3GPP) long-term evolution (LTE) system, a 3GPP LTE-A (advanced) system, and an institute of electrical and electronics engineers (IEEE) 802.16 (WiMax, WiBro) system. The WLAN system may be an IEEE 802.11 (Wi-Fi) system. In particular, WLAN is a wireless communication system that is commonly used for various user equipments, and thus, the cellular-WLAN interoperation is a high-priority convergence technique. Offloading by the cellular-WLAN interoperation may increase the coverage and capacity of the cellular system.

The arrival of the ubiquitous environment led to a sharp increase in demand for seamless services anytime, anywhere. The fifth generation mobile communication system may adopt a plurality of radio access technologies (RATs) for always gaining easy access and maintaining efficient performance in any place. In other words, the fifth-generation mobile communication system may use multiple RATs in a converging manner through the interoperation between heterogeneous wireless communication systems. Each entity in the plurality of RATs constituting a fifth-generation mobile communication system may exchange information therebetween, and accordingly, the optimal communication system may be provided to a user in the fifth-generation mobile communication system. Among the plurality of RATs constituting the fifth-generation mobile communication system, a specific RAT may operate as a primary RAT system, and another specific RAT may operate as a secondary RAT system. That is, the primary RAT system may mainly play a role to provide a communication system to a user in the fifth-generation mobile communication system, while the secondary RAT system may assist the primary RAT system. In general, a 3GPP LTE(-A) or IEEE 802.16 cellular system with relatively broad coverage may be a primary RAT system, and a Wi-Fi system with relatively narrower coverage may be a secondary RAT system.

In a fifth-generation mobile communication system constituted of a plurality of RATs, a primary RAT system needs to grasp the entities of a secondary RAT system that operates within its own coverage. For example, in case that a primary RAT system is a cellular system, and a secondary RAT system is a Wi-Fi system, a cellular node such as an eNodeB (eNB), mobility management entity (MME), or new cellular entity need be aware of which access points (APs) are in operation within its coverage. An entity of a secondary RAT system should report information on itself to a management device (for example, management server) existing in the secondary RAT system. In this case, the entity of the secondary RAT system may acquire information on the primary RAT system through the connection of the secondary RAT system with a general device, and may report information on itself to the management device based on the acquired information on the primary RAT system through a wire network of the secondary RAT system.

When the entity of the secondary RAT system acquires information on the primary RAT system using a general device, there is a need for a method to reduce overhead of the entity of the secondary RAT system and the general device and to efficiently acquire information on the primary RAT system.

SUMMARY OF THE INVENTION

The present invention provides a method and apparatus for acquiring information using a device in an idle state in a wireless communication system. The present invention provides a method for acquiring, by an entity of a secondary radio access technology (RAT) system, information on a first RAT system using a general device in an idle state. The present invention provides a method for acquiring, by an entity of a secondary RAT system, information on a first RAT system by extending waiting time.

In an aspect, a method of acquiring, by an entity of a secondary radio access technology (RAT) system, information on a primary RAT system in a wireless communication system is provided. The method includes transmitting a request for information on a primary RAT system to a multi-RAT device supporting a plurality of RATs, upon transmitting the request, starting a waiting timer which has a default value, receiving a response of the request, which includes a rejection for the request and a reason for the rejection, from the multi-RAT device, if it is determined that the information on the primary RAT system cannot be acquired, by the multi-RAT device, until the waiting timer expires, reconfiguring the waiting timer based on the response, and receiving a second response of the request, which includes an approval for the request and the information on the primary RAT system, from the multi-RAT device, before the reconfigured waiting timer expires.

The waiting timer may be reconfigured by having a value of the remaining time, until the waiting timer expires, plus the default value.

The response may further include additional time.

The waiting timer may be reconfigured by having a value of the remaining time, until the waiting timer expires, plus the additional time.

The reason for the rejection may be lack of processing time.

The request may be received through a advanced primary RAT system information request (ARSI-REQ) frame, and the response may be transmitted through a advanced primary RAT system information response (ARSI-RSP) frame.

The primary RAT system may be a cellular system, and the secondary RAT system may be a Wi-Fi system.

The entity of the secondary RAT system may be an access point (AP).

In another aspect, a method of transmitting, by a multi radio access technology (RAT) device supporting a plurality of RATs, information on a primary RAT system in a wireless communication system is provided. The method includes receiving a request for information on a primary RAT system from an entity of a secondary RAT system, upon receiving the request, starting a waiting timer which has a default value, determining whether or not the information on the primary RAT system can be acquired from a base station of the primary RAT system until the waiting timer expires, if it is determined that the information on the primary RAT system cannot be acquired until the waiting timer expires, transmitting a response of the request, which includes a rejection for the request and a reason for the rejection, to the entity of the secondary RAT system.

The method may further includes transmitting a second response of the request, which includes an approval for the request and the information on the primary RAT system, to the entity of the secondary RAT system before a reconfigured waiting timer expires.

Whether the information on the primary RAT system can be acquired until the waiting timer expires may be determined based on at least one of a primary synchronization signal (PSS), secondary synchronization signal (SSS), broadcast channel, tracking area update (TAU) procedure or a random access procedure.

In another aspect, a method of transmitting, by a multi radio access technology (RAT) device supporting a plurality of RATs, information in a wireless communication system is provided. The method includes transmitting a type of a primary RAT system to which the multi-RAT device accesses and a status of the multi-RAT device in the primary RAT system, to an entity of a secondary RAT system, and receiving a request for information on the primary RAT system from the entity of the secondary RAT system.

The type of the primary RAT system and the status of the multi-RAT device may be transmitted using one of a probe frame, authentication frame, or association frame.

The type of the primary RAT system and the status of the multi-RAT device may be transmitted using newly defined frame.

An entity of a second RAT system can acquire information on a first RAT system efficiently.

BRIEF DESCRIPTION OF THE DRAWINGS

FIG. 4 shows an example of a frame structure of IEEE 802.11.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and it adopts OFDMA in downlink (DL) and SC-FDMA in uplink (UL). LTE-A (advanced) is the evolution of 3GPP LTE.

3GPP LTE(-A) and IEEE 802.11 are chiefly described as an example in order to clarify the description, but the technical spirit of the present invention is not limited to 3GPP LTE(-A) and IEEE 802.11.

Figure 1:
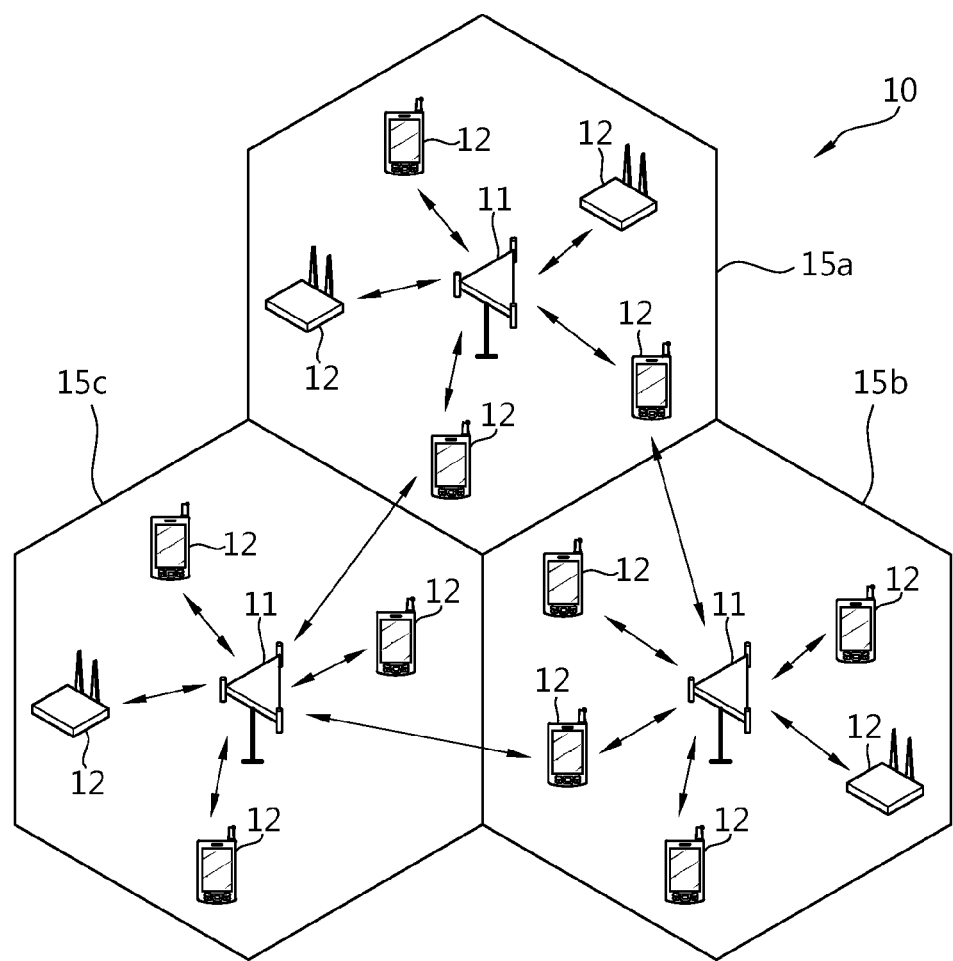
FIG. 1 shows a cellular system.

FIG. 1 shows a cellular system.

Referring to FIG. 1, the cellular system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
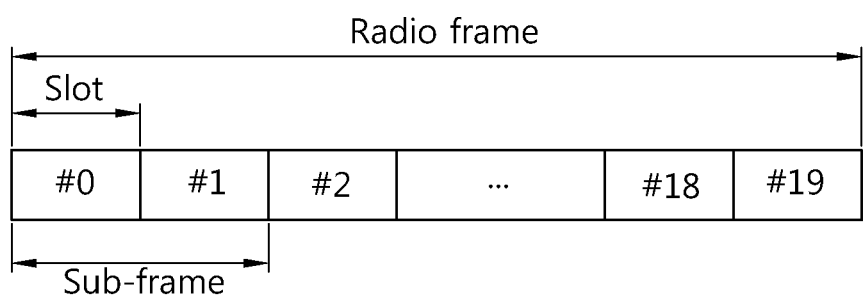
FIG. 2 shows a structure of a radio frame in 3GPP LTE.

FIG. 2 shows a structure of a radio frame in 3GPP LTE. It may be referred to Section 4 of 3GPP TS 36.211 V8.2.0 (2008-03).

Referring to FIG. 2, the radio frame includes 10 subframes, and one subframe includes two slots. The slots in the radio frame are numbered by #0 to #19. A transmission time interval (TTI) is a scheduling unit for a data transmission. In 3GPP LTE, one TTI may be identical with a time taken for transmitting one subframe. A radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
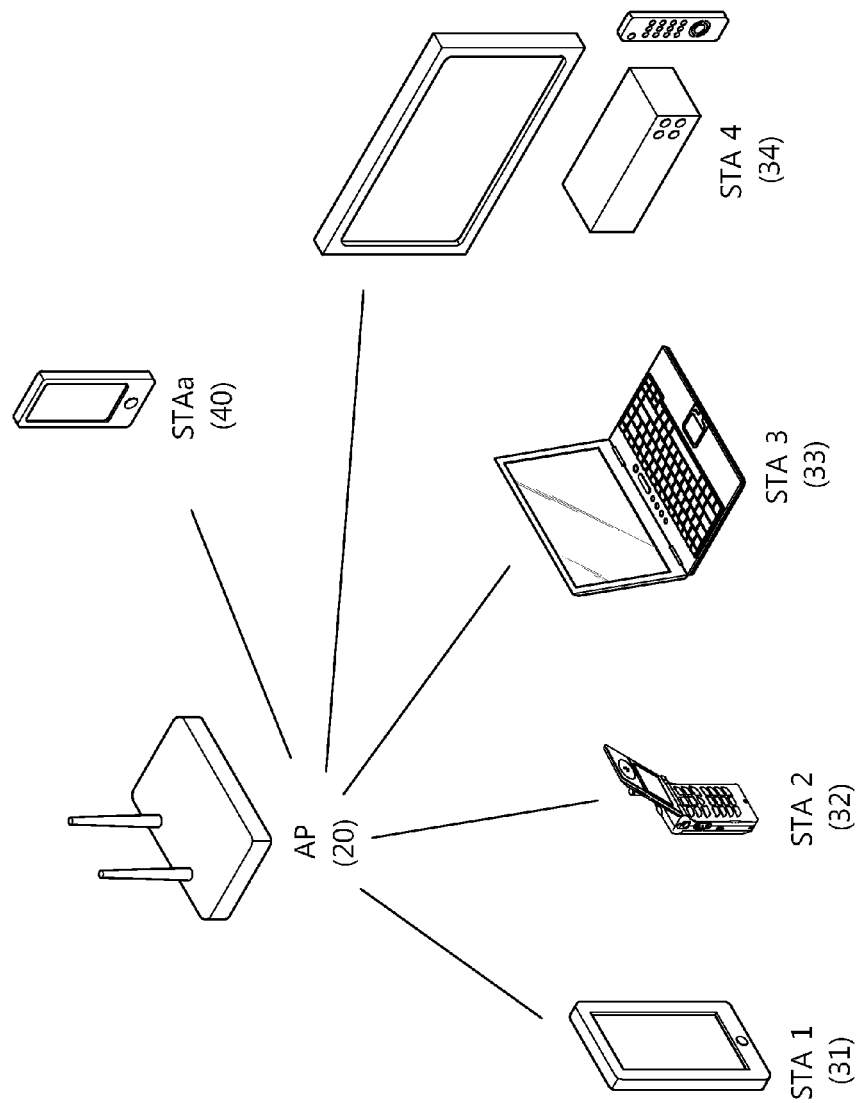
FIG. 3 shows a wireless local area network (WLAN) system.

FIG. 3 shows a wireless local area network (WLAN) system.

The WLAN system may also be referred to as a Wi-Fi system. Referring to FIG. 3, the WLAN system includes one access point (AP) 20 and a plurality of stations (STAs) 31, 32, 33, 34, and 4). The AP 20 may be linked to each STA 31, 32, 33, 34, and 40 and may communicate therewith. The WLAN system includes one or more basic service sets (BSSs). The BSS is a set of STAs that may be successfully synchronized with each other and may communicate with each other, and does not mean a specific region.

An infrastructure BSS includes one or more non-AP stations, APs that provide a distribution service (DS), and a DS that links a plurality of APs with each other. In the infrastructure BSS, an AP manages non-AP STAs of the BSS. Accordingly, the WLAN system shown in FIG. 3 may include an infrastructure BSS. In contrast, an independent BSS (IBSS) is a BSS that operates in ad-hoc mode. The IBSS does not include an AP and thus lacks a centralized management entity. That is, in the IBSS, the non-AP STAs are managed in a distributed manner. The IBSS may have all the STAs constituted of mobile STAs and is not allowed to access the distribution system, thus achieving a self-contained network.

The STA is random functional medium that includes a physical layer interface for a wireless medium and an media access control (MAC)) observing IEEE 802.11 standards, and in its broader concepts, it includes both the AP and non-AP station.

The non-AP STA is an STA, not an AP. The non-AP STA may also be referred to as a mobile terminal, a wireless device, a wireless transmit/receive unit (WTRU), a user equipment (UE), a mobile station (MS), a mobile subscriber unit or simply as a user. Hereinafter, for ease of description, the non-AP STA denotes an STA.

The AP is a functional entity that provides access to a distribution system via a wireless medium for an STA associated with the AP. In the infrastructure BSS including an AP, communication between STAs is basically done via an AP, but in case a direct link is established, direct communication may be achieved between STAs. The AP may also be referred to as a central controller, a base station (BS), a NodeB, a base transceiver system (BTS), or a site controller.

A plurality of infrastructure BSSs may be linked with each another through a distribution system. The plurality of BSSs linked with each another is referred to as an extended service set (ESS). The APs and/or STAs included in the ESS may communicate with each other, and in the same ESS, an STA may move from one BSS to another, while in seamless communication.

FIG. 4 shows an example of a frame structure of IEEE 802.11.

A frame of IEEE 802.11 includes a set of fields in a fixed order. Referring to FIG. 4, the frame of IEEE 802.11 includes a frame control field, a duration/ID field, an address 1 field, an address 2 field, an address 3 field, a sequence control field, an address 4 field, a quality of service (QoS) control field, an HT control field, a frame body field, and a frame check sequence (FCS) field. Among the fields listed above, the frame control field, the duration/ID field, the address 1 field, and the FCS field constitute a minimum IEEE 802.11 frame format, and may be included in all IEEE 802.11 frames. The address 2 field, the address 3 field, the sequence control field, the address 4 field, the QoS control field, the HT control field, and the frame body field may be included only in a specific frame type.

The frame control field may include various subfields. The duration/ID field may be 16 bits in length. The address field may include a basic service set identifier (BSSID), a source address (SA), a destination address (DA), a transmitting STA address (TA), and a receiving STA address (RA). In the address field, different fields may be used for other purposes according to a frame type. The sequence control field can be used when fragments are reassembled or when an overlapping frame is discarded. The sequence control field may be 16 bits, and may include two subfields indicating a sequence number and a fragment number. The FCS field can be used to check an error of a frame received by a station. The FCS field may be a 32-bit field including a 32-bit cyclic redundancy check (CRC). An FCS can be calculated across the frame body field and all fields of a media access control (MAC) header.

The frame body field may include information specified for an individual frame type and subtype. That is, the frame body field carries high-level data from one station to another station. The frame body field can also be called a data field. The frame body field can be variously changed in length. A minimum length of the frame body field may be zero octet. A maximum length of the frame body field may be determined by a total sum of a maximum length of a MAC service data unit (MSDU), a length of a mesh control field, and an overhead for encryption or a total sum of a maximum length of an aggregated MSDU (A-MSDU) and an overhead for encryption. The data frame includes high-level protocol data of the frame body field. The data frame may always include the frame control field, the duration/ID field, the address 1 field, the address 2 field, the address 3 field, the sequence control field, the frame body field, and the FCS field. A presence of an address 4 field may be determined by a configuration of a 'To DS' subfield and a 'From DS' subfield in the frame control field. Another data frame type can be categorized according to a function.

A management frame may always include the frame control field, the duration/ID field, the address 1 field, the address 2 field, the address 3 field, the sequence control field, the frame body field, and the FCS field. Data included in the frame body field generally uses a fixed-length field called a fixed field and a variable-length field called an information element. The information element is a variable-length data unit.

The management frame can be used for various purposes according to a subtype. That is, a frame body field of a different subtype includes different information. A beacon frame reports an existence of a network, and takes an important role of network maintenance. The beacon frame corresponds to a parameter which allows a mobile station to participate in the network. In addition, the beacon frame is periodically transmitted so that the mobile station can scan and recognize the network. A probe request frame is used to scan an IEEE 802.11 network in which the mobile station exists. A probe response frame is a response for the probe request frame. An authentication request is used so that the mobile station requests an access point to perform authentication. An authentication response frame is a response for the authentication request frame. A de-authentication frame is used to finish an authentication relation. An association request frame is transmitted so that the mobile station participates in the network when the mobile station recognizes the compatible network and is authenticated. An association response frame is a response for the association request frame. A de-association frame is used to finish an association relation.

Three states may exist according to an authentication and association procedure in IEEE 802.11. Table 1 below shows the three states of IEEE 802.11.

TABLE 1

|  | Authentication | Association |
|---|---|---|
| State 1 | X | X |
| State 2 | O | X |
| State 3 | O | O |

To transmit a data frame, a device must perform the authentication and association procedure with respect to a network. In Table 1, a procedure of transitioning from the state 1 to the state 2 can be called the authentication procedure. The authentication procedure can be performed in such a manner that one device acquires information on a different device and authenticates the different device. The information on the different device can be acquired by using two methods, i.e., a passive scanning method for acquiring information on a different node by receiving a beacon frame and an active scanning method for acquiring the information on the different device by transmitting a probe request message and receiving a probe response message received in response thereto. The authentication procedure can be complete by exchanging an authentication request frame and an authentication response frame.

In Table 1, a procedure of transitioning from the state 2 to the state 3 can be called the association procedure. The association procedure can be complete when two devices exchange the association request frame and the association response frame upon completion of the authentication procedure. An association ID can be allocated by the association procedure.

Figure 5:
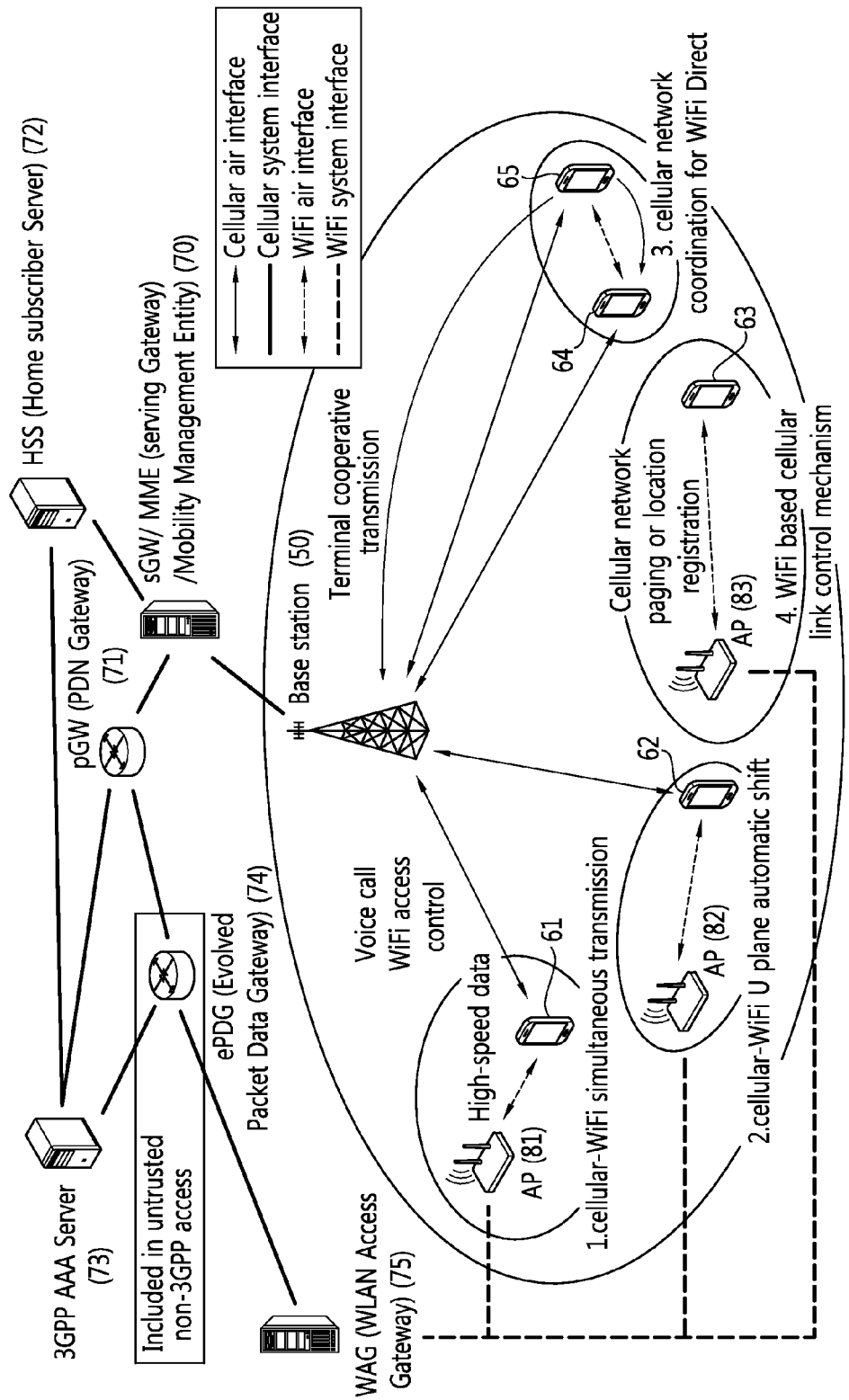
FIG. 5 shows an example of a scenario of a converged communication system of a cellular system and a Wi-Fi system.

FIG. 5 shows an example of a scenario of a converged communication system of a cellular system and a Wi-Fi system.

It is assumed in FIG. 5 that the cellular system operates as a primary RAT system of the converged communication system, and the Wi-Fi system operates as a secondary RAT system of the converged communication system. Further, the cellular system may be a 3GPP LTE(-A) system. Hereinafter, for ease of description, it is assumed that the primary RAT system of the converged communication system is a 3GPP LTE(-A) system, and the secondary RAT system of the communication system is an IEEE 802.11 system, i.e., a Wi-Fi system. However, embodiments of the present invention are not limited thereto.

Referring to FIG. 5, there are a plurality of general devices 61, 62, 63, 64, and 65 in the coverage of the cellular base station 50. Each of the general devices 61, 62, 63, 64, and 65 may be a user equipment in a cellular system. The cellular base station 50 may communicate with each of the general devices 61, 62, 63, 64, and 65 via a cellular radio interface. For example, the cellular base station 50 may perform voice call communication with each of the general devices 61, 62, 63, 64, and 65 or may control access of each general device 61, 62, 63, 64, and 65 to a Wi-Fi system.

The cellular base station 50 is connected to a serving gateway (S-GW)/mobility management entity (MME) 70 through a cellular system interface. The MME contains a user equipment's access information or information on a user equipment's capability, and such information may be mainly used for mobility management. The MME is in charge of a control plane. The S-GW is a gateway having an E-UTRAN as an end point. The S-GW is in charge of a user plane. The S-GW/MME 70 is connected to a packet data network (PDN) gateway (P-GW) 71 and an home subscriber server (HSS) 72 through the cellular system interface. The PDN-GW is a gateway having a PDN as an end point.

The P-GW 71 and the HSS 72 are connected to a 3GPP access authentication authorization (AAA) server 73 through the cellular system interface. The P-GW 71 and the 3GPP AAA server 73 may be connected to an evolved packet data gateway (e-PDG) 74 through the cellular system interface. The e-PDG 74 may be included only in untrusted non-3GPP access. The e-PDG 74 may be connected to a WLAN access gateway (WAG) 75. The WAG 75 may be in charge of a P-GW in a Wi-Fi system.

Meanwhile, a plurality of APs 81, 82, and 83 may be present in the coverage of the cellular base station 50. Each of the APs 81, 82, and 83 may have coverage which is shorter than that of the cellular base station 50. Each of the APs 81, 82, and 83 may communicate with general devices 61, 62, and 63 that are present in its coverage through a Wi-Fi radio interface. In other words, the general devices 61, 62, and 63 may communicate with the cellular base station 50 and/or APs 81, 82, and 83. Communication methods of the general devices 61, 62, and 63 are as follows:

1) Cellular/Wi-Fi simultaneous radio transmission: the general device 61 may perform high-speed data communication with the AP 81 through a Wi-Fi radio interface while communicating with the cellular base station 50 through a cellular radio interface.

2) Cellular/Wi-Fi user plane automatic shift: the general device 62 may communicate with one of the cellular base station 50 and the AP 82 by user plane automatic shift. At this time, the control plane may be present in both the cellular system and the Wi-Fi system or only in the cellular system.

3) Terminal cooperative transmission: the general device 64 operating as a source device may directly communicate with the cellular base station 50 through a cellular radio interface or may indirectly communicate with the cellular base station 50 through a general device 65 operating as a cooperative device. That is, the cooperative device 65 may assist the source device 64 so that the source device 64 may indirectly communicate with the cellular base station 50 through itself. The source device 64 and the cooperative device 65 communicate with each other through a Wi-Fi radio interface.

4) Wi-Fi-based cellular link control mechanism: the AP 83 may perform a cellular link control mechanism such as paging or location registration of a network for the cellular general device 63. The general device 63 is not directly connected to the cellular base station 50 and may directly communicate with the cellular base station 50 thorough the AP 83.

Each of the APs 81, 82, and 83 is connected to the WAG 75 through a Wi-Fi system interface.

An entity of a secondary RAT system should report information on itself to a management device (for example, management server) existing in the secondary AT system. In this case, the entity of the secondary RAT system requests information on the primary RAT system to the general device through connection of the secondary RAT system with the general device, and the general device transfers the acquired information on the primary RAT system to the entity of the secondary RAT system. The entity of the secondary RAT system may report information on itself to the management device based on the acquired information on the primary RAT system through a wire network of the secondary RAT system. The information on the primary RAT system acquired by the entity of the secondary RAT system may include network identification (ID) such as public land mobile network (PLMN) ID, a base station controller ID such as a mobility management entity (MME) ID, a cell/base station ID, and location information using location technology, etc.

When the entity of the secondary RAT system requests the information on the primary RAT system to the general device, the general device may perform an additional operation according to a state of the general device in the primary RAT system in order to acquire the information on the primary RAT system. For example, when the general device is in an idle state, the general device may perform a tracking area update (TAU) procedure in order to acquire the information on the primary RAT system. The general device in the idle state may be a device which is not in an RRC connection state (RRC CONNECTED) or may be a device which is not in an EPS connection management (ECM) connection state (ECM-CONNECTED).

Hereinafter, it is assumed that the primary RAT system is a 3GPP LTE (or 3GPP LTE-A) which is a cellular system, and the secondary RAT system an IEEE 802.11(Wi-Fi) which is a WLAN system. However, the embodiment of the present invention is not limited thereto. When the secondary RAT system is an IEEE 802.11, the entity of the secondary RAT system may be an AP. Further, the general device may be a multi-RAT device to support a plurality of RATs. Hereinafter, the general device and the multi-RAT device may be commonly used.

Figure 6:
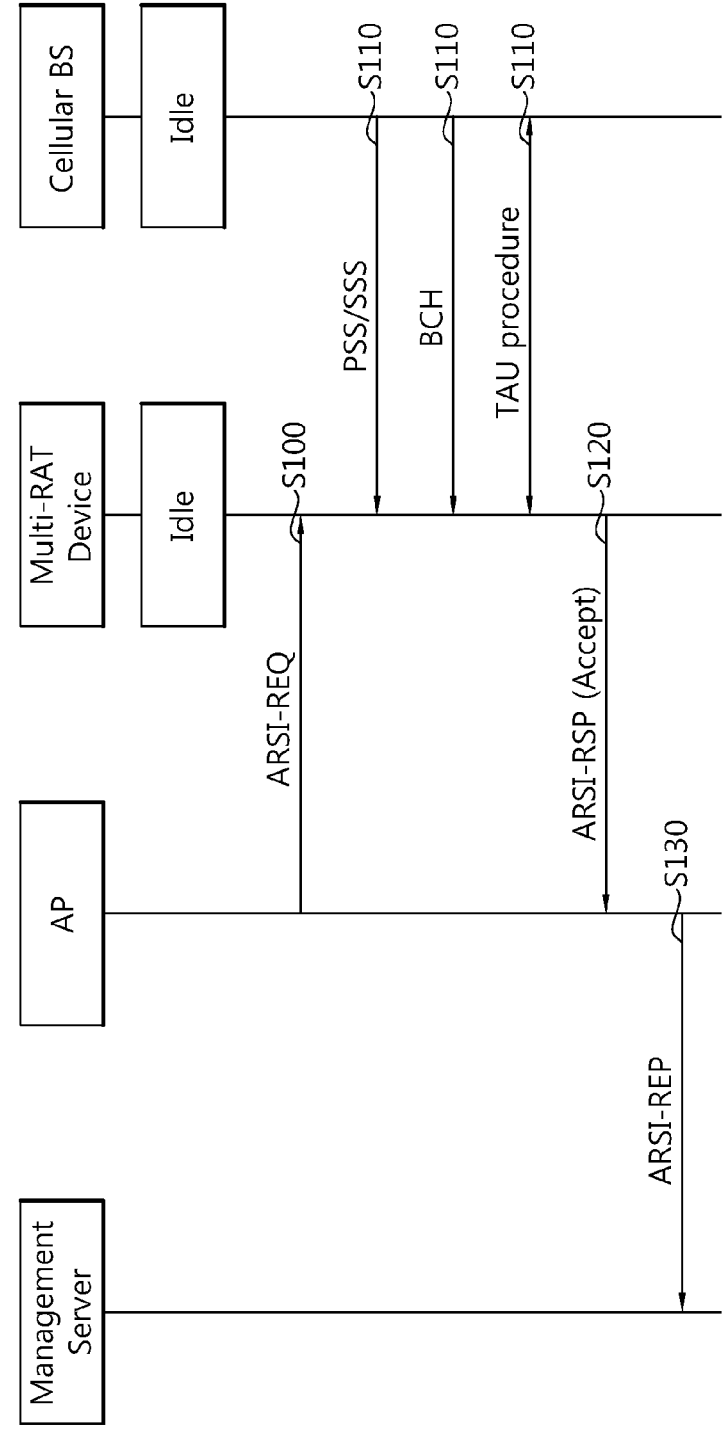
FIG. 6 is an example of a method of acquiring information on a cellular system using a multi-RAT device in an idle state.

FIG. 6 is an example of a method of acquiring information on a cellular system using a multi-RAT device in an idle state.

In step S100, an AP transmits an advanced primary RAT system information request (ARSI-REQ) frame to the multi-RAT device so that the information on the cellular system is requested to the multi-RAT device. The ARSI-REQ frame may have a format of a management MAC frame of an existing IEEE 802.11. The AP may select at least one multi-RAT device from all multi-RAT devices which has Wi-Fi wireless connection with the AP. This is because a form of a hierarchical network must be considered.

In step S110, the multi-RAT device may receive a primary synchronization signal (PSS)/secondary synchronization signal (SSS) from the base station or a system information block (SIB) through a broadcast channel (BCH) in order to acquire information on the cellular system. The multi-RAT device may perform a TAU procedure with the base station.

In step S120, the multi-RAT device transmits an advanced primary RAT system information response (ARSI-RSP) frame as a response to the ARSI-REQ frame to the AP through Wi-Fi wireless connection so that the information on the cellular system is transferred to the AP. The ARSI-RSP frame may have a format of a management MAC frame of an existing IEEE 802.11. The ARSI-RSP frame may include a result (approval/rejection) for the request of the AP. It is assumed that the multi-RAT device approves a request of the AP in FIG. 6. Further, it is assumed to approve that the cellular system and the multi-RAT device transfer information on the cellular system to other system.

In step S130, upon receiving the ARSI-RSP frame from the multi-RAT device, the AP transmits an advanced primary RAT system information report (ARSI-REP) frame to a management server so that the acquired information on the cellular system is transferred. When additional information is required, steps S100 to step S120 may be repeatedly performed.

As described above, the management server may be a device to provide a generic advertisement service (GAS) using an access network query protocol (ANQP). The ANQP is a query protocol for access network information retrieval transported by GAS public action frames. GAS provides functionality that enables STAs to discover the availability of information related to desired network services, e.g., information about services such as provided in an IBSS, local access services, available subscription service providers (SSPs) and/or subscription service provider networks (SSPNs) or other external networks. GAS uses a generic container to advertise network services' information over an IEEE 802.11 network. Public action frames are used to transport this information. Further, the management server may be a WAG. A new entity may be added between the AP and the management server so that a corresponding entity may combine information on the cellular system transmitted from the AP, change a transmission format, and transmit the combined information to the management server. The added new entity may be a dual-stack gateway or an AP controller, etc.

Figure 7:
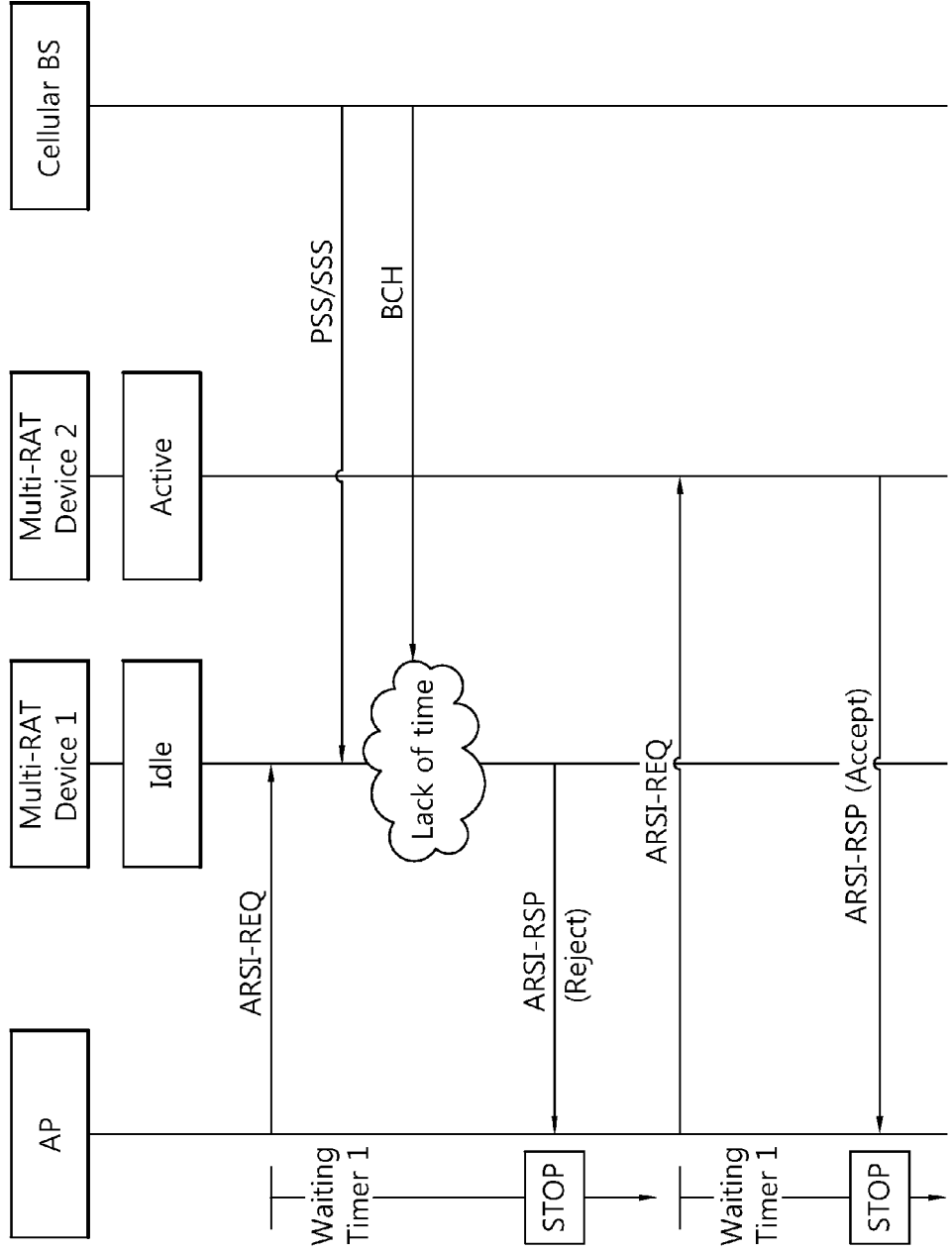
FIG. 7 shows lack of time which may occur when information on the cellular system is acquired using a multi-RAT device in an idle state.

FIG. 7 shows lack of time which may occur when information on the cellular system is acquired using a multi-RAT device in an idle state.

When the multi-RAT device receives an ARSI-REQ from an AP, a waiting timer in the AP and the multi-RAT device may start. The multi-RAT device may transmit an ARSI-RSP frame including information on the cellular system while the waiting timer is operating. If the multi-RAT device does not receive the information on the cellular system while the waiting timer is operating, the multi-RAT device may set a result for a request of the AP as rejection to transmit an ARSI-RSP frame to the AP. However, since the multi-RAT device in the idle state may receive PSS/SSS/BCH or the like or performs a TAU procedure in order to acquire the information on the cellular system, the multi-RAT device may not acquire all information on the cellular system requested by the AP while the waiting timer is operating. That is, due to the lack of time, the multi-RAT device may not acquire the information on the cellular system. In this case, the request of the AP to the multi-RAT device fails, and the AP should request the information on the cellular system to another multi-RAT device in an active state. That is, the AP should repeatedly request the information on the cellular system, and consequentially, the PSS/SSS/BCH reception and TAU procedure performed by the multi-RAT device in an idle state may be unnecessary. Accordingly, signaling overhead may occur in the AP and the multi-RAT device in the idle state.

Therefore, there is a need for a method of efficiently acquiring, by an AP, information on a cellular system using the multi-RAT device in an idle state. According to an embodiment of the present invention, an AP may efficiently acquire information on the cellular system through Wi-Fi wireless connection with the multi-RAT device by extending an operation time of waiting timer. The operation time of the waiting timer may be extend being fixed or may be extend being dynamically changed. Accordingly, a default value of the waiting timer may be determined as an optimized value by taking a response process time of the multi-RAT device in an active state into consideration. That is, the default value of the timer may be determined by taking a minimum process time such as a time of generating an ARSI-RSP frame including the information on the cellular system included in the multi-RAT device. The AP may request the information on the cellular system to only a multi-RAT device in an active state, not the multi-RAT device in the idle state. The information on the cellular system acquired by the AP may include an ID of a serving base station and location information using location technology.

Figure 8:
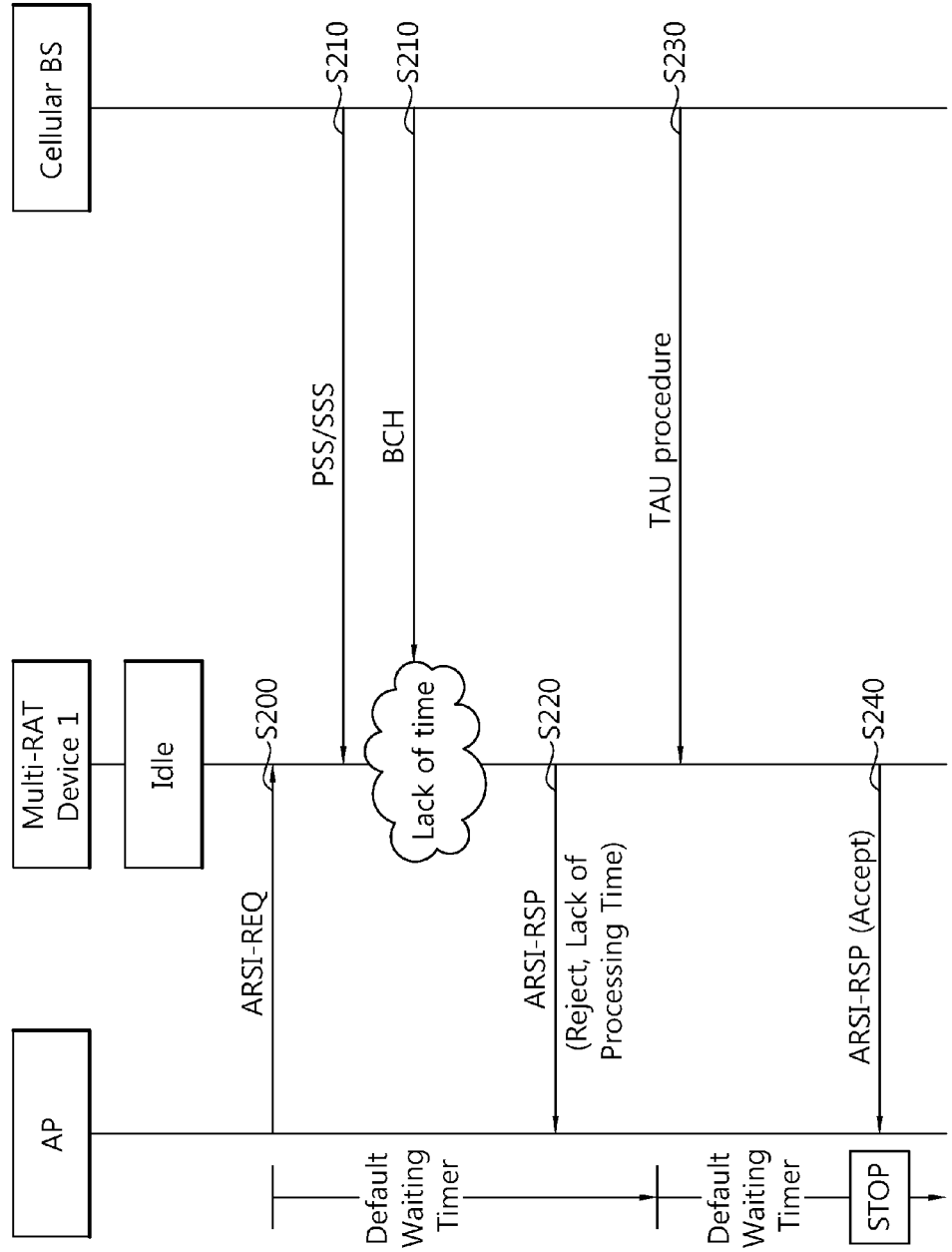
FIG. 8 shows an example of a method of acquiring information on a cellular system according to an embodiment of the present invention.

FIG. 8 shows an example of a method of acquiring information on a cellular system according to an embodiment of the present invention.

In step S200, the AP transmits an ARSI-REQ frame to the multi-RAT device in an idle state. In this case, a waiting timer in the AP and the multi-RAT device starts. An operation time of the waiting timer is set to a default value. The default value may be previously set between the AP and the multi-RAT device. In step S210, upon receiving the ARSI-REQ frame, the multi-RAT device may receive PSS/SSS and/or receive SIB through a BCH so as to acquire the information on the cellular system.

The multi-RAT device may determine that information on the cellular system requested by the AP cannot be acquired while the waiting timer is operating. The multi-RAT device may determine whether information on a cellular system can be acquired while the waiting timer is operating by taking all of reception of PSS/SSS, reception of the SIB through the BCH, TAU procedure and random access procedure into consideration. In this case, in step S220, the multi-RAT device transmits an ARSI-RSP frame to the AP so that extension of the waiting timer is requested. A frame body field of the ARSI-RSP frame may include a result for a request of the AP set to rejection and a reason for the rejection. The reason for the rejection may be lack of processing time. In step S230, the multi-RAT device and a base station perform a TAU procedure.

Upon receiving the ARSI-RSP frame from the multi-RAT device, the AP may reconfigure the operation time of the waiting timer to a fixed value of (remaining time of the waiting timer+default value) to wait for an ARSI-RSP frame transmitted from the multi-RAT device again. In this case, a maximum value of the operation time of the waiting timer may be a (default value*2). In step S240, the AP may receive an ARSI-RSP frame where a result for a request of the AP from the multi-RAT device is set to approval.

Figure 9:
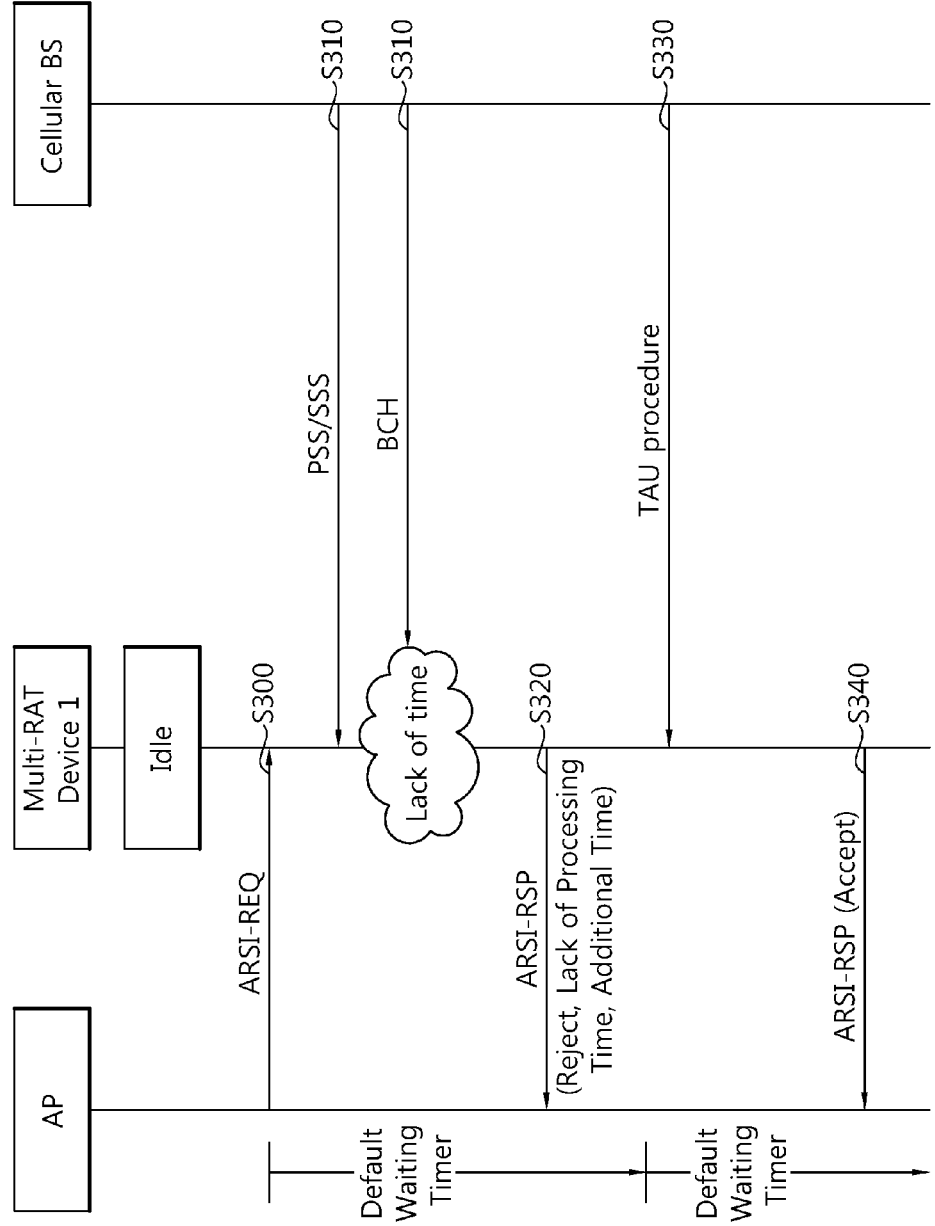
FIG. 9 shows another example of a method of acquiring information on a cellular system according to an embodiment of the present invention.

FIG. 9 shows another example of a method of acquiring information on a cellular system according to an embodiment of the present invention.

In step S300, the AP transmits an ARSI-REQ frame to the multi-RAT device in an idle state. In this case, a waiting timer in the AP and the multi-RAT device starts. An operation time of the waiting timer is set to a default value. The default value may be previously set between the AP and the multi-RAT device. In step S310, upon receiving the ARSI-REQ frame, the multi-RAT device may receive PSS/SSS and/or receive SIB through a BCH so as to acquire the information on the cellular system.

The multi-RAT device may determine that information on the cellular system requested by the AP cannot be acquired while the waiting timer is operating. The multi-RAT device may determine whether information on a cellular system can be acquired while the waiting timer is operating by taking all of reception of PSS/SSS, reception of the SIB through the BCH, TAU procedure and random access procedure into consideration. In this case, in step S220, the multi-RAT device transmits an ARSI-RSP frame to the AP so that extension of the waiting timer is requested. A frame body field of the ARSI-RSP frame may include a result for a request of the AP set to rejection, a reason for the rejection, and a required additional time. The reason for the rejection may be lack of processing time. The multi-RAT device may determine the required additional time by various schemes. In step S330, the multi-RAT device and a base station perform a TAU procedure.

Upon receiving the ARSI-RSP frame from the multi-RAT device, The AP may reconfigure the operation time of the waiting timer to (remaining time of the waiting timer+required additional time) to wait for an ARSI-RSP frame transmitted from the multi-RAT device again. In this case, a maximum value of the operation time of the waiting timer may be a (default value+required additional time). That is, while the operation time of the waiting timer is reconfigured to a fixed value having (remaining time of the waiting timer+default value) in an embodiment of FIG. 8, the operation time of the waiting timer may be reconfigured to a dynamic value having (remaining time of the waiting timer+required additional time) by the multi-RAT device. In step S340, the AP may receive an ARSI-RSP frame where a result for a request of the AP is set to approval from the multi-RAT device.

Alternatively, the AP may request information on a cellular system to only a multi-RAT device in an active state. In this case, the AP should know a state of the multi-RAT device in the cellular system. To this end, the multi-RAT device needs to transmit the frame including the state of the multi-RAT device in the cellular system to the AP. The state of the multi-RAT device in the cellular system transmitted from the multi-RAT device may be transmitted according to a request of the AP or without the request of the AP in an unsolicited manner. The multi-RAT device may transmit the state of the multi-RAT device in the cellular system using one of a probe frame, an authentication frame, and an association frame which are frames of an existing WLAN system. The multi-RAT device may define a new frame to transmit the state of the multi-RAT device in the cellular system. That is, a new frame to request/response device specific information such as a type of a cellular system in which the multi-RAT device exists and a state of the multi-RAT device in the cellular system.

Figure 10:
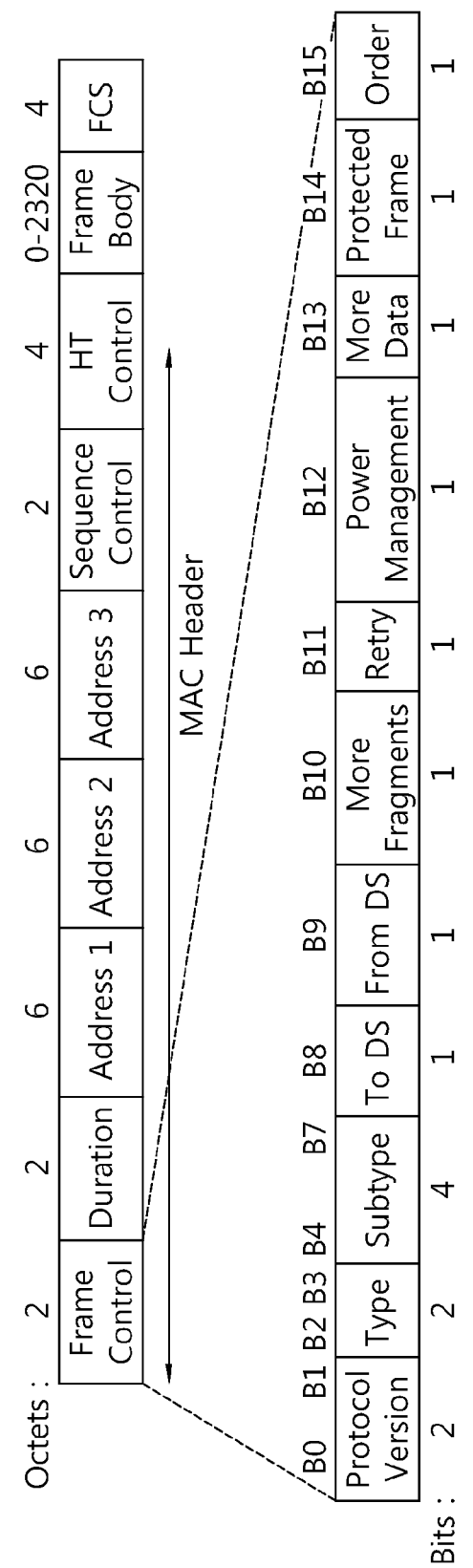
FIG. 10 shows an example of a frame structure for transmission of information on a cellular system according to an embodiment of the present invention.

FIG. 10 shows an example of a frame structure for transmission of information on a cellular system according to an embodiment of the present invention.

Referring to FIG. 10, the new frame may be used, as is, in the form of an existing management MAC frame as standardized in IEEE 802.11. In other words, the frame, like the IEEE 802.11 management frame, may include a frame control field, a duration/ID field, an address 1 field, an address 2 field, an address 3 field, a sequence control field, an HT control field, a frame body field, and an FCS field.

Further, the frame control field may include a protocol version subfield, a type subfield, a subtype subfield, a to DS subfield, a from DS subfield, a more fragments subfield, a retry subfield, a power management subfield, a more data subfield, a protected frame subfield, and an order subfield. Table 2 represents the type subfield and subtype subfield in the frame control field.

TABLE 2

| Type value b3 b2 | Type description | Subtype value b7 b6 b4 b4 | Subtype description |
|---|---|---|---|
| 00 | Data | 1101 | Reserved |
| 01 | Data | 1110 | QoS CF-Poll (no data) |
| 10 | Data | 1111 | QoS CF-Ack + CF-Poll (no data) |
| 11 | Reserved | 0000-1100 | Reserved |

In order to transmit information such as a type of the cellular system in which a multi-RAT device exists and the state of the multi-RAT device in the cellular system, a reserved field of a type subfield and/or a subtype subfield in the frame control field. For example, a type subfield having a value of 0b11 may indicate an inter-RAT working management. Further, a subtype subfield having a value of 0b0100 indicates a specific inter-RAT information request, and a subtype subfield having a value of 0b0101 indicates a specific inter-RAT information response. That is, in order the multi-RAT device for transmitting the state of the multi-RAT device in the cellular system, a type subfield in the frame control field may be set to 0b11, and the subtype subfield may be set to 0b0101.

A frame body field of the newly defined frame may include a system type indicating a type of a cellular system accessed by a corresponding multi-RAT device and a state of a corresponding multi-RAT device in the cellular system. The system type may be one of a 3GPP LTE, 3GPP LTE-A, GSM, GPRS, WiMAX, UMTS, and high speed downlink packet access (HSDPA). The state of the multi-RAT device may be one of an active state, an idle state, and a null state.

Figure 11:
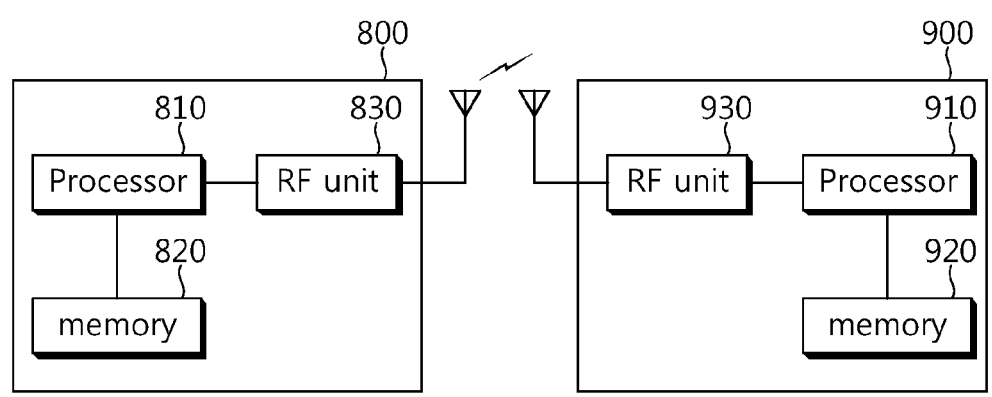
FIG. 11 is a block diagram showing wireless communication system to implement an embodiment of the present invention.

FIG. 11 is a block diagram showing wireless communication system to implement an embodiment of the present invention.

A general device 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An AP or cellular node 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of acquiring information related to a primary system in a wireless communication system, the method performed by a secondary entity of a secondary system and comprising:

transmitting a request for the information to a multi-radio access technology (RAT) device supporting a primary RAT for the primary system and a secondary RAT for the secondary system when the multi-RAT device is in a radio resource control (RRC) idle state for the primary system;

starting a timer having a default value upon transmitting the request;

receiving a first response to the request from the multi-RAT device if the requested information is not acquired by the multi-RAT device before the timer expires, the first response indicating rejection of the request and a reason for the rejection;

reconfiguring the timer based on the first response; and receiving a second response to the request from the multi-RAT device before the reconfigured timer expires, the second response indicating approval of the request and including the requested information.

2. The method of claim 1, wherein reconfiguring the timer comprises adding a remaining time until the timer expires to the default value.

3. The method of claim 1, wherein the first response further indicates an additional time.

4. The method of claim 3, wherein reconfiguring the timer comprises adding a value of the remaining time until the timer expires to the indicated additional time.

5. The method of claim 1, wherein the indicated reason is lack of processing time.

6. The method of claim 1, wherein:
the request is transmitted via an advanced primary RAT system information request frame; and
the first response is received via an advanced primary RAT system information response frame.

7. The method of claim 1, wherein:
the primary system is a cellular system; and
the secondary system is a wireless local area network system.

8. The method of claim 1, wherein the secondary entity system is an access point.

9. A method of transmitting information related to a primary system in a wireless communication system, the method performed by a multi-radio access technology (RAT) device supporting a primary RAT for the primary system and a secondary RAT for a secondary system and comprising:
entering a radio resource control (RRC) idle state for the primary system;
receiving a request for the information from a secondary entity of the secondary system while operating in the RRC idle state;
starting a timer having a default value upon receiving the request;
determining whether the requested information is acquired from a primary entity of the primary system before the timer expires;
transmitting a first response to the request to the secondary entity if it is determined that the requested information is not acquired before the timer expires, the first response indicating rejection for the request and a reason for the rejection; and
transmitting a second response to the request to the secondary entity before a reconfigured timer expires, the second response indicating approval of the request and including the requested information.

10. The method of claim 9, wherein whether the requested information is acquired before the timer expires is determined based on at least a primary synchronization signal, a secondary synchronization signal, a broadcast channel, a tracking area update procedure or a random access procedure.

* * * * *